(12) United States Patent
Akiyama et al.

(10) Patent No.: US 9,013,625 B2
(45) Date of Patent: Apr. 21, 2015

(54) CONTROL DEVICE, CONTROL METHOD, AND PROGRAM

(71) Applicant: Sony Corporation, Tokyo (JP)

(72) Inventors: Hisashi Akiyama, Tokyo (JP); Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 42 days.

(21) Appl. No.: 13/926,368

(22) Filed: Jun. 25, 2013

(65) Prior Publication Data

US 2014/0009669 A1   Jan. 9, 2014

(30) Foreign Application Priority Data

Jul. 3, 2012   (JP) ................................. 2012-149007

(51) Int. Cl.
*H04N 5/235*    (2006.01)
*H04N 9/07*    (2006.01)

(52) U.S. Cl.
CPC .............. *H04N 5/2353* (2013.01); *H04N 9/07* (2013.01)

(58) Field of Classification Search
CPC .................................................. H04N 5/2353
USPC .................... 348/294–332, 231.99–231.9
See application file for complete search history.

(56) References Cited

U.S. PATENT DOCUMENTS

| | | | |
|---|---|---|---|
| 2013/0057744 A1* | 3/2013 | Minagawa et al. | 348/311 |
| 2014/0211059 A1* | 7/2014 | Aoki | 348/311 |
| 2014/0232913 A1* | 8/2014 | Sakane | 348/294 |

* cited by examiner

*Primary Examiner* — Tuan Ho
(74) *Attorney, Agent, or Firm* — Sony Corporation (57) ABSTRACT

There is provide a control device including an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, an exposure information generation unit that generates exposure information for controlling exposure during imaging of a subject based on electric signals obtained from photoelectric conversion performed by the second light sensing elements, and an exposure control unit that controls exposure based on the exposure information.

16 Claims, 7 Drawing Sheets

CONTROL DEVICE, CONTROL METHOD, AND PROGRAM

BACKGROUND

The present disclosure relates to a control device, a control method, and a program, and particularly to a control device, a control method, and a program that enable quick control of exposure even when, for example, a subject with high luminance is imaged.

In the related art, for example, a digital camera is designed to control exposure when a subject is imaged based on an output result output from a built-in imaging element (for example, refer to Japanese Unexamined Patent Application Publication No. 2008-145889).

In other words, the digital camera of the related art, for example, controls exposure in such a way that the amount of light incident on the imaging element is measured based on a result output from the imaging element, and, based on the measurement result, a diaphragm value and a shutter speed during imaging are adjusted.

SUMMARY

Meanwhile, when a large amount of light is incident on an imaging element due to a subject having high luminance, for example, the imaging element is saturated, and thus, it is very difficult to accurately measure the amount of the incident light based on a result output from the imaging element.

In this case, since it is difficult to accurately measure the amount of the incident light, exposure is controlled by adjusting a diaphragm value in order to regulate light incident on the imaging element via a lens.

However, since a diaphragm that regulates incident light according to diaphragm values is mechanically operated, it is difficult to quickly control exposure.

It is desirable to enable quick control of exposure even when a subject with high luminance is imaged.

According to an embodiment of the present disclosure, there is provide a control device including an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, an exposure information generation unit that generates exposure information for controlling exposure during imaging of a subject based on electric signals obtained from photoelectric conversion performed by the second light sensing elements, and an exposure control unit that controls exposure based on the exposure information.

The control device may further include light blocking units provided on the second light sensing elements so that part of the incident light is blocked. The second light sensing elements may perform photoelectric conversion to convert incident light of the second light sensing amount sensed through the light blocking units into the electric signals.

The light blocking units may be polarizers that block part of the incident light by polarizing the incident light.

Among the plurality of light sensing elements provided in the imaging element, a second number of the second light sensing elements may be disposed, the second number being lower than a first number, in a block in which the first number of light sensing elements are set to be one unit.

Within the block, at least one type of the polarizers may be provided.

Within the block, a first polarizer which transmits only light corresponding to transverse electric (TE) waves and a second polarizer which transmits only light corresponding to transverse magnetic (TM) waves may be provided.

Filters that separate colors may be provided on the first light sensing elements, and the polarizers may be provided on the second light sensing elements.

The filters on which the polarizers are superimposed may also be provided on the second light sensing elements.

The respective filters disposed on the plurality of light sensing elements may be arrayed according to a Bayer array.

The control device may further include a determination unit that determines a type of the incident light based on electric signals output from the second light sensing elements on which the first polarizers are provided and electric signals output from other second light sensing elements on which the second polarizers are provided.

The control device may further include an imaging generation unit that generates captured images obtained by imaging subjects based at least on electric signals obtained from the first light sensing elements, and a setting unit that sets an imaging mode of the imaging generation unit based on a determination result of the determination unit.

The exposure information generation unit may generate the exposure information based on electric signals obtained from photoelectric conversion performed by the first light sensing elements when an amount of incident light is less than a predetermined amount of light, and generate the exposure information based on electric signals obtained from photoelectric conversion performed by the second light sensing elements when an amount of incident light is equal to or greater than the predetermined amount of light.

The second light sensing elements may sense incident light in the second light sensing amount on light sensing faces of the second light sensing elements, the light sensing faces being smaller than light sensing faces of the first light sensing elements.

The second light sensing elements may sense incident light in the second light sensing amount for a light sensing time which is shorter than a light sensing time of the first light sensing elements.

According to an embodiment of the present disclosure, there is provided a control method of a control device that includes an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, the control method performed by the control device, including generating exposure information for controlling exposure during imaging of a subject based on electric signals obtained from photoelectric conversion performed by the second light sensing elements, and controlling exposure based on the exposure information.

According to an embodiment of the present disclosure, there is provided a program that instructs a computer of a control device, which includes an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, to function as an exposure information generation unit that generates exposure information for controlling exposure during imaging of a subject based on electric signals obtained from photoelectric conversion performed by the second light sensing elements, and an exposure control unit that controls exposure based on the exposure information.

According to an embodiment of the present disclosure described above, exposure information used to control exposure during imaging of a subject is generated based on an electric signal obtained by the second light sensing element performing photoelectric conversion, and thereby exposure is controlled based on the exposure information.

According to the present disclosure, exposure can be quickly controlled even when, for example, a subject with high luminance is imaged.

DETAILED DESCRIPTION OF THE EMBODIMENT

Hereinafter, a preferred embodiment of the present disclosure (hereinafter, referred to as "the present embodiment") will be described. It should be noted that description will be provided in the following order.

1. Present embodiment (An example in which a polarizer is provided in some light sensing elements)
2. Modified example 1. Present Embodiment

[Configuration Example of Digital Camera 1]

Figure 1:
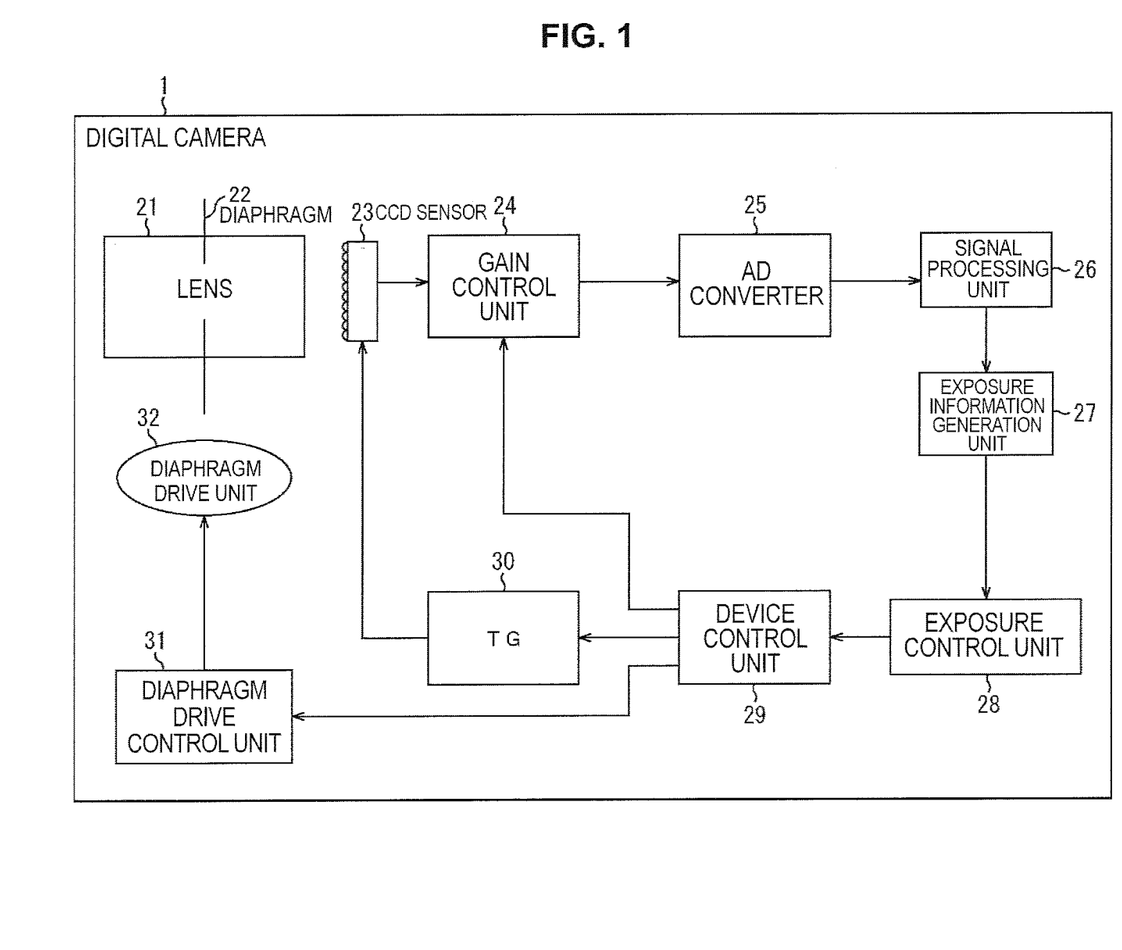
FIG. 1 is a block diagram showing a configuration example of a digital camera according to the present disclosure.

FIG. 1 shows a configuration example of a digital camera 1 according to the present embodiment.

The digital camera 1 includes a lens 21, a diaphragm 22, a CCD (Charge Coupled Device) sensor 23, a gain control unit 24, an AD (Analog to Digital) converter 25, a signal processing unit 26, an exposure information generation unit 27, an exposure control unit 28, a device control unit 29, a timing generator (TG) 30, a diaphragm drive control unit 31, and a diaphragm drive unit 32.

The lens 21 collects incident light (for example, reflected light from a subject, and the like). In other words, the lens 21 forms an image of incident light on a sensor face (face provided on the lens 21 side) of the CCD sensor 23.

The diaphragm 22 adjusts the amount of light incident on the CCD sensor 23 by changing the opening diameter thereof.

On the sensor face of the CCD sensor 23, a plurality of light sensing elements that convert light incident via the lens 21 into electric signals are provided, and in the plurality of light sensing elements, color filters for separating colors are arranged according to, for example, a Bayer array.

Furthermore, in some of the plurality of light sensing elements, polarizers which cause incident light to be polarized are disposed in a superimposing manner on the filters. It is assumed that all of the plurality of light sensing elements have the same degree of sensitivity to light sensing.

Figure 2:
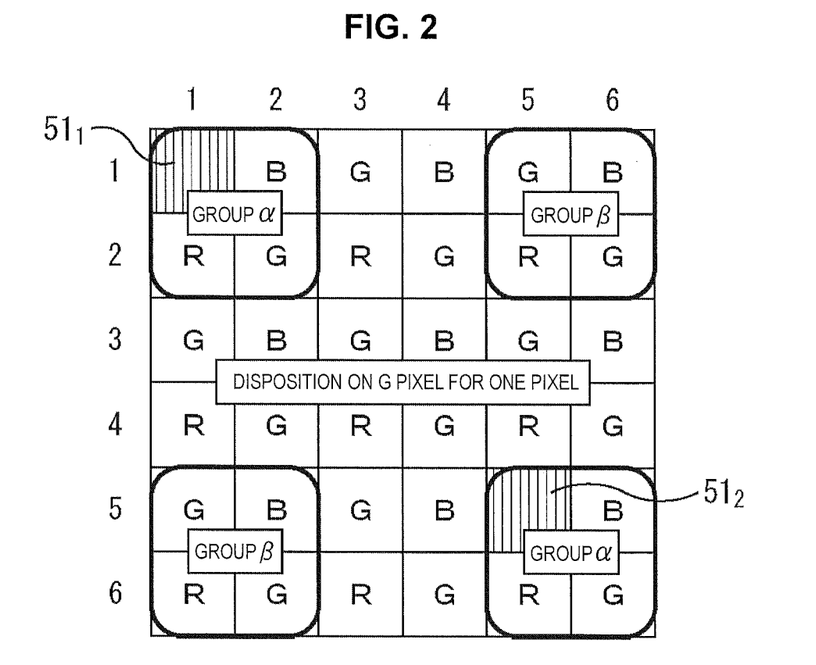
FIG. 2 is a first diagram showing an example of a sensor face of a CCD sensor.

Next, FIG. 2 shows an example of the sensor face of the CCD sensor 23.

On the sensor face of the CCD sensor 23, a plurality of light sensing elements (m,n) are provided as shown in FIG. 2. Here, a light sensing element (m,n) indicates a light sensing element present in the $m^{th}$ row and the $n^{th}$ column.

Note that, in order to avoid complexity of FIG. 2, the state in which color filters R, G, and B which respectively cover 36 (6×6) light sensing elements (1,1) to (6,6) are arranged according to the Bayer array is shown, but the number of light sensing elements is not limited to 36.

In addition, as the filters provided on the light sensing elements, there are filters R through which only R components penetrate, filters G through which only G components penetrate, and filters B through which only B components penetrate among components R, G, and B of light incident on the CCD sensor 23.

In other words, on each of the light sensing elements (1,1), (1,3), (1,5), (2,2), (2,4), (2,6), (3,1), (3,3), (3,5), (4,2), (4,4), (4,6), (5,1), (5,3), (5,5), (6,2), (6,4), and (6,6), the filters G are provided.

It should be noted that there are cases in which the filters G provided in $1^{st}$, $3^{rd}$, and $5^{th}$ rows in FIG. 2 are called filters Gb and the filters G provided in $2^{nd}$, $4^{th}$, and $6^{th}$ rows are called filters Gr for the sake of convenience, but there is no difference therebetween in terms of structure and function. For this reason, in the present specification, the filters are simply referred to as filters G without discriminating filters Gb and filters Gr.

Furthermore, in the light sensing element (1,1), a polarizer $51_1$ is placed on the filter G in a superimposing manner, and in the light sensing element (5,5), a polarizer $51_2$ is placed on the filter G in a superimposing manner. Note that, when it is not necessary to distinguish the polarizer $51_1$ from the polarizer $51_2$, the polarizers $51_1$ and $51_2$ are simply called polarizers 51.

The polarizer $51_1$ polarizes incident light so as to block incident light to, for example, ½ of the amount, and causes light of the remaining ½ to penetrate. In other words, the polarizer $51_1$ functions as the diaphragm 22 corresponding to one stage. The same applies to the polarizer $51_2$.

Figure 3:
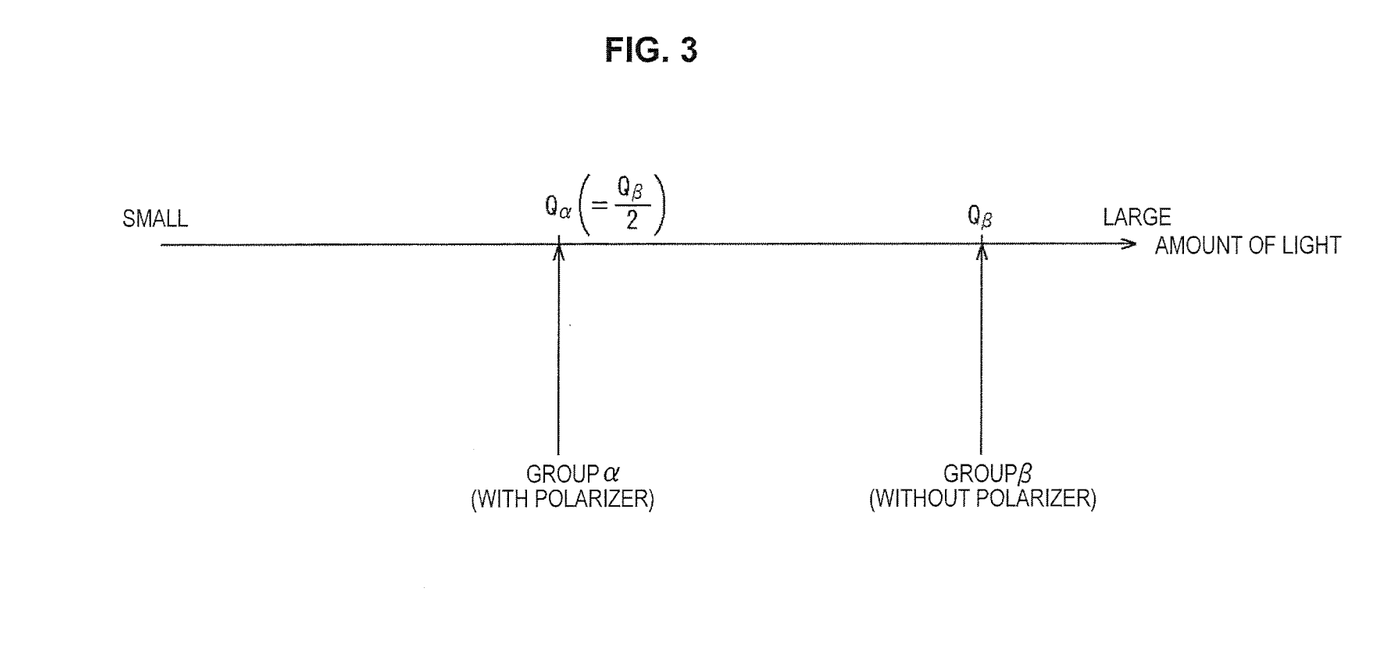
FIG. 3 is a diagram illustrating that the effect of diaphragm of one stage is exhibited by a polarizer.

Accordingly, as shown in FIG. 3, the amount $Q_\alpha$ of light sensed by the light sensing elements (1,1) and (5,5) is ½ of the amount $Q_\beta$ of light sensed by, for example, light sensing elements (1,5) and (5,1).

Herein, as the polarizers $51_1$ and $51_2$, for example, either polarizer that causes only light corresponding to transverse electric (TE) waves to penetrate or a polarizer that causes only light corresponding to transverse magnetic (TM) waves to penetrate can be employed.

It should be noted that a TE wave indicates a polarized wave of an incident wave generated when an electric field is perpendicular to an incident plane, and is also called a perpendicular polarized wave. In addition, a TM wave indicates a polarized wave of an incident wave generated when a magnetic field is perpendicular to an incident plane, and is also called a parallel polarized wave.

In addition, the polarizers $51_1$ and $51_2$ are provided in the light sensing elements (1,1) and (5,5), but, anything may be provided as long as it restricts the amount of incident light, without being limited to the polarizers $51_1$ and $51_2$. To be specific, for instance, a light blocking plate, or the like, that blocks (shields from light) a part of the light sensing faces of the light sensing elements (1,1) and (5,5) may be provided instead of the polarizers $51_1$ and $51_2$. Furthermore, the polarizers $51_1$ and $51_2$ block the amount of incident light by ½, but the blocked amount of light is not limited thereto.

In FIG. 2, electric signals output from the light sensing elements (1,1) and (5,5) are used in the exposure information generation unit 27 to generate an exposure evaluation value $x_\alpha$. Here, the exposure evaluation value $x_\alpha$ refers to exposure information used in an AE (Auto Exposure) process performed when the amount of light incident on the CCD sensor 23 is relatively large.

It should be noted that, in FIG. 2, the light sensing elements on the upper left corner in groups α each of which includes four light sensing elements are decided as the light sensing elements (1,1) and (5,5) used to generate the exposure evaluation value $x_\alpha$.

Here, the group α refers to a set of four light sensing elements in which a filter G is disposed on the light sensing element placed in the upper left corner, a filter B is disposed on the light sensing element placed in the upper right corner, another filter G is disposed on the light sensing element placed in the lower right corner, and a filter R is disposed on the light sensing element placed in the lower left corner.

In FIG. 2, two groups α are set, but the number of groups α is not limited to two, and can be set to an arbitrary number. In FIG. 2, the number of light sensing elements used to generate the exposure evaluation value $x_\alpha$ coincides with the number of groups α.

In addition, in FIG. 2, the groups α are disposed on the upper left and the lower right sides of the drawing, but the positions of the groups α are not limited thereto, and can be set to an arbitrary position. In other words, light sensing elements that output electric signals used when the exposure evaluation value $x_\alpha$ is generated are disposed in different positions according to the positions of the groups α.

In addition, electric signals output from the light sensing elements (5,1) and (1,5) are respectively used when an exposure evaluation value $x_\beta$ is generated in the exposure information generation unit 27. Here, the exposure evaluation value $x_\beta$ refers to exposure information used in an AE process performed when the amount of light incident on the CCD sensor 23 is relatively small.

It should be noted that, in FIG. 2, the light sensing elements on the upper left corner in groups β each of which includes four light sensing elements are decided as the light sensing elements (5,1) and (1,5) that output electric signals used to generate the exposure evaluation value $x_\beta$. It should be noted that the number and the positions of the groups β can be arbitrarily set in the same manner as the groups α.

Furthermore, filters B are respectively provided on light sensing elements (1,2), (1,4), (1,6), (3,2), (3,4), (3,6), (5,2), (5,4), and (5,6).

In addition, filters R are respectively provided on light sensing elements (2,1), (2,3), (2,5), (4,1), (4,3), (4,5), (6,1), (6,3), and (6,5).

The light sensing elements (1,1) to (6,6) of the CCD sensor 23 sense light incident via the lens 21 by respectively operating according to timing signals supplied from the timing generator 30 of FIG. 1. Then, the light sensing elements (1,1) to (6,6) each perform photoelectric conversion on sensed light, and supply electric signals obtained from the photoelectric conversion to the gain control unit 24.

In other words, electric signals R are supplied from the light sensing elements on which the filters R are provided to the gain control unit 24, electric signals G are supplied from the light sensing elements on which the filters G are provided to the gain control unit 24, and electric signals B are supplied from the light sensing elements on which the filters B are provided to the gain control unit 24.

Note that, out of the electric signals G, an electric signal G obtained from the photoelectric conversion performed by the light sensing elements (1,1) and (5,5) is also called an electric signal $G_\alpha$. In addition, an electric signal G obtained from the photoelectric conversion performed by the light sensing elements (5,1) and (1,5) is also called an electric signal $G_\beta$.

Furthermore, in the present embodiment, the CCD sensor 23 has been described as an example of an imaging element, but the imaging element is not limited thereto, and, for example, a CMOS (Complementary Metal Oxide Semiconductor) sensor, or the like, can be used.

Returning to FIG. 1, the gain control unit 24 adjusts gains of each of the electric signals R, G, and B output from the respective light sensing elements (1,1) to (6,6) of the CCD sensor 23 according to the control of the device control unit 29, and supplies the adjusted electric signals R, G, and B to the AD converter 25.

The AD converter 25 performs AD conversion on the electric signals R, G, and B as analog signals supplied from the gain control unit 24, and then supplies the electric signals R, G, and B as digital signals obtained from the AD conversion to the signal processing unit 26.

The signal processing unit 26 generates a captured image obtained in imaging or a subject by performing a demosaicing process based on, for example, the electric signals R, G, and B output from the AD converter 25. Here, the demosaicing process is an interpolation process to interpolate each component of pixels constituting a captured image so that components R, G, and B are aligned.

It should be noted that the captured image generated by the signal processing unit 26 is stored in a storage unit, or the like not shown in the drawing.

Herein, the electric signals $G_\alpha$ from the light sensing elements (1,1) and (5,5) on which the polarizers 51 are provided may also be used in the signal processing unit 26 to generate the captured image, or may be used in the exposure information generation unit 27 only to generate the exposure evaluation value $x_\alpha$.

In other words, on the sensor face of the CCD sensor 23, light sensing elements on which the polarizers 51 are provided may be disposed in imaging regions in which light sensing elements used to generate a captured image (light sensing elements on which the polarizers 51 are not provided) are disposed. In addition, for example, the light sensing elements on which the polarizers 51 are provided may be disposed in processing regions in which light sensing elements which are not used in generating a captured image are disposed. It should be noted that such processing regions are provided in, for example, the periphery of the imaging regions.

To be specific, the light sensing elements on which the polarizers 51 are provided may be disposed, for example, at the center portion of the imaging regions, and can also be disposed in the processing regions provided in the periphery of the imaging regions, in addition to the center portion of the imaging regions.

Furthermore, when the light sensing elements on which the polarizers 51 are provided are provided in the imaging regions, for example, and the signal processing unit 26 interpolates, for example, pixels of the captured image for the purpose of reducing the amount of data, pixels generated by electric signals output from the light sensing elements on which the polarizers 51 are provided can be configured to be interpolated.

In addition, for example, the signal processing unit 26 determines whether or not the amount of light incident on the CCD sensor 23 is greater than a predetermined amount of light based on the electric signals R, G, and B output from the AD converter 25.

It should be noted that the predetermined amount of light is an amount of light of an extent to which exposure is difficult to quickly control in the AE process using the exposure evaluation value $x_\beta$.

When the signal processing unit 26 determines that the amount of light incident on the CCD sensor 23 is greater than the predetermined amount of light, the unit supplies electric signals $G_\alpha$ from the light sensing elements (1,1) and (5,5) out of the electric signals R, G, and B to the exposure information generation unit 27.

In addition, when the signal processing unit 26 determines that the amount of light incident on the CCD sensor 23 is not greater than a predetermined amount of light, the unit supplies electric signals $G_\beta$ from the light sensing elements (1,5) and (5,1) out of the electric signals R, G, and B to the exposure information generation unit 27.

The exposure information generation unit 27 generates an exposure evaluation value x in proportion to an electric signal G based on the electric signals supplied from the signal processing unit 26, and then supplies the value to the exposure control unit 28.

In other words, when the electric signals $G_\alpha$ are supplied from the signal processing unit 26, for example, the exposure information generation unit 27 generates the exposure evaluation value $x_\alpha$ based on the electric signals $G_\alpha$, and then supplies the value to the exposure control unit 28.

In addition, when the electric signals $G_\beta$ are supplied from the signal processing unit 26, for example, the exposure information generation unit 27 generates the exposure evaluation value $x_\beta$ based on the electric signals $G_\beta$, and then supplies the value to the exposure control unit 28.

The exposure control unit 28 compares the exposure evaluation value x supplied from the exposure information generation unit 27 to a reference evaluation value that serves as a reference, and performs the AE process to control at least one of a diaphragm value, a shutter speed, and a gain so that the exposure evaluation value x is equal to the reference evaluation value.

In other words, for example, the exposure control unit 28 changes at least one of a diaphragm value used to control the opening diameter of the diaphragm 22, a shutter speed, and a gain using the device control unit 29 so that the exposure evaluation value x generated in the exposure information generation unit 27 is adjusted so as to be equal to the reference evaluation value.

After all, control is performed so that the diaphragm value is adjusted to a predetermined value by controlling the diaphragm 22 using the diaphragm drive control unit 31 and the diaphragm drive unit 32, the shutter speed is adjusted to a predetermined value by controlling the CCD sensor 23 using the timing generator 30, and the gain is adjusted to a predetermined value by controlling the gain control unit 24.

It should be noted that a hill climbing method, or the like can be used in the AE process. In addition, it is assumed that the reference evaluation value is retained in advance in a built-in memory of the exposure control unit 28, which is not shown in the drawing. Furthermore, with regard to the reference evaluation value, different values are used when the AE process is performed using the exposure evaluation value $x_\alpha$ and when using the exposure evaluation value $x_\beta$.

This is because, while the exposure evaluation value $x_\alpha$ is generated from electric signals $G_\alpha$ generated using ½ of the amount of light incident on the CCD sensor 23, the exposure evaluation value $x_\beta$ is generated from electric signals $G_\beta$ generated using the amount of light incident on the CCD sensor 23.

The device control unit 29 controls the gain control unit 24, the timing generator 30, and the diaphragm drive control unit 31 according to the control of the exposure control unit 28.

The timing generator 30 generates timing signals that cause the CCD sensor 23 to operate and supplies the signals to the CCD sensor 23 according to control of the device control unit 29.

The timing generator 30 generates timing signals that cause the CCD sensor 23 to operate to control exposure times according to control of the device control unit 29. An exposure time is controlled as the shutter speed is controlled. In other words, shutter speed is controlled by the device control unit 29.

In this manner, by controlling the diaphragm value, the shutter speed, and the gain, brightness of a captured image obtained by imaging a subject is controlled. In other words, brightness of a captured image is controlled by the device control unit 29.

The diaphragm drive control unit 31 is configured by, for example, a motor drive, and controls operations of the diaphragm drive unit 32 according to control of the device control unit 29. In other words, a diaphragm value of the diaphragm 22 is controlled by the device control unit 29.

The diaphragm drive unit 32 is configured by, for example, a stepping motor, and causes the diaphragm 22 to drive according to control of the diaphragm drive control unit 31.

[Description of Operation of Digital Camera 1]

Figure 4:
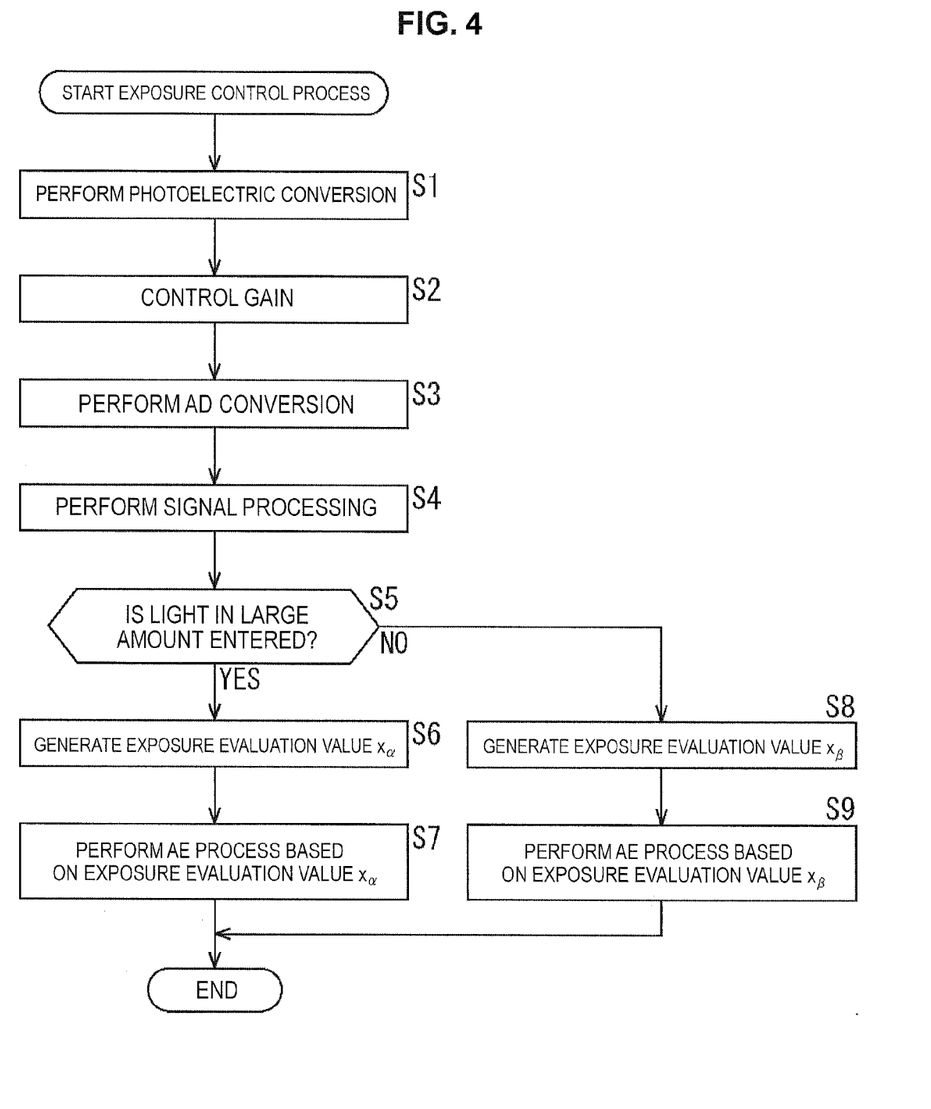
FIG. 4 is a flowchart for describing an exposure control process performed by the digital camera.

Next, an exposure control process performed by the digital camera 1 will be described referring to the flowchart of FIG. 4.

In Step S1, the plurality of light sensing elements (1,1) to (6,6) of the CCD sensor 23 respectively perform photoelectric conversion on light received via the lens 21, and supply electric signals R, G, and B obtained from the photoelectric conversion to the gain control unit 24.

In Step S2, the gain control unit 24 adjusts the gains of the electric signals R, G, and B output from the CCD sensor 23 according to control of the device control unit 29, and then supplies the adjusted electric signals R, G, and B to the AD converter 25.

In Step S3, the AD converter 25 performs AD conversion on the electric signals R, G, and B as analog signals from the gain control unit 24, and then supplies the electric signals R, G, and B as digital signals obtained from the AD conversion to the signal processing unit 26.

In Step S4, the signal processing unit 26 generates a captured image obtained by imaging a subject by performing a demosaicing process based on the electric signals R, G, and B output from the AD converter 25. Here, the demosaicing process is an interpolation process to interpolate each component of pixels constituting a captured image so that components R, G, and B are aligned.

In Step S5, the signal processing unit 26 determines whether or not the amount of light incident on the CCD sensor 23 is greater than a predetermined amount of light based on the electric signals R, G, and B output from the AD converter 25.

Then, when the signal processing unit 26 determines that the amount of light incident on the CCD sensor 23 is greater than the predetermined amount of light, the unit supplies electric signals $G_\alpha$ from the light sensing elements (1,1) and (5,5) out of the electric signals R, G, and B to the exposure information generation unit 27, and then the process proceeds to Step S6.

In Step S6, the exposure information generation unit 27 generates an exposure evaluation value $x_\alpha$ based on the electric signals $G_\alpha$ supplied from the signal processing unit 26, and then supplies the value to the exposure control unit 28.

In Step S7, the exposure control unit 28 performs the AE process based on the exposure evaluation value $x_\alpha$ supplied from the exposure information generation unit 27, and after the AE process is completed, the exposure control process ends.

In addition, in Step S5, when the signal processing unit 26 determines that the amount of light incident on the CCD sensor 23 is not greater than the predetermined amount of light, the unit supplies electric signals $G_\beta$ from the light sensing elements (1,5) and (5,1) out of the electric signals R, G, and B to the exposure information generation unit 27, and then the process proceeds to Step S8.

In Step S8, the exposure information generation unit 27 generates an exposure evaluation value $x_\beta$ based on the electric signals $G_\beta$ supplied from the signal processing unit 26, and then supplies the value to the exposure control unit 28.

In Step S9, the exposure control unit 28 performs the AE process based on the exposure evaluation value $x_\beta$ supplied from the exposure information generation unit 27, and after the AE process is completed, the exposure control process ends.

As will be described below, when the amount of light incident on the CCD sensor 23 is large, the AE process using the generated exposure evaluation value $x_\alpha$ is set to be performed according to the exposure control process.

For this reason, when the amount of light incident on the CCD sensor 23 is large, for example, the above case is compared to the case in which the AE process is performed using the exposure evaluation value $x_\beta$, and a time in which diaphragm is adjusted by one stage can be omitted, and thus, exposure can be quickly controlled.

In addition, the exposure control process is useful even in a situation in which a shutter speed has to be fixed to a certain level, in other words, even when it is necessary to control exposure using the diaphragm 22.

Furthermore, exposure can be more quickly controlled in the exposure control process in the same manner even when a shutter speed is used to control exposure.

Figure 5:
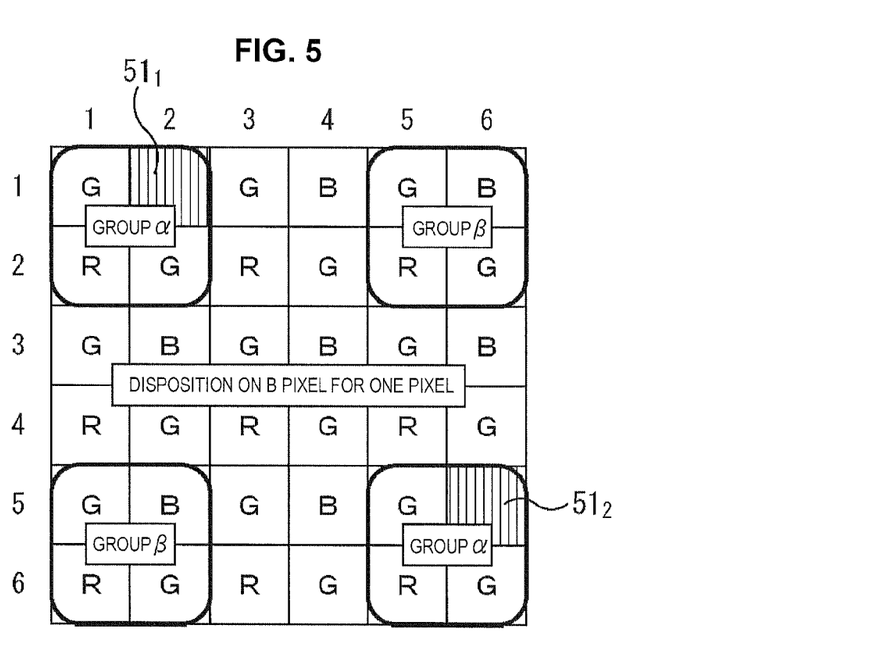
FIG. 5 is a second diagram showing another example of the sensor face of the CCD sensor.

It should be noted that, in the present embodiment, the polarizers 51 are superimposed on the filters G as shown in FIG. 2, but, as shown in FIG. 5, for example, the polarizers 51 may be superimposed on the filters B. The same applies with respect to the filters R.

In the case of FIG. 5, for example, the exposure evaluation value $x_\alpha$ is generated based on electric signals $B_\alpha$ output from the light sensing elements (1,2) and (5,6), and the exposure evaluation value $x_\beta$ is generated based on electric signals $B_\beta$ output from the light sensing elements (1,6) and (5,2).

Figure 6:
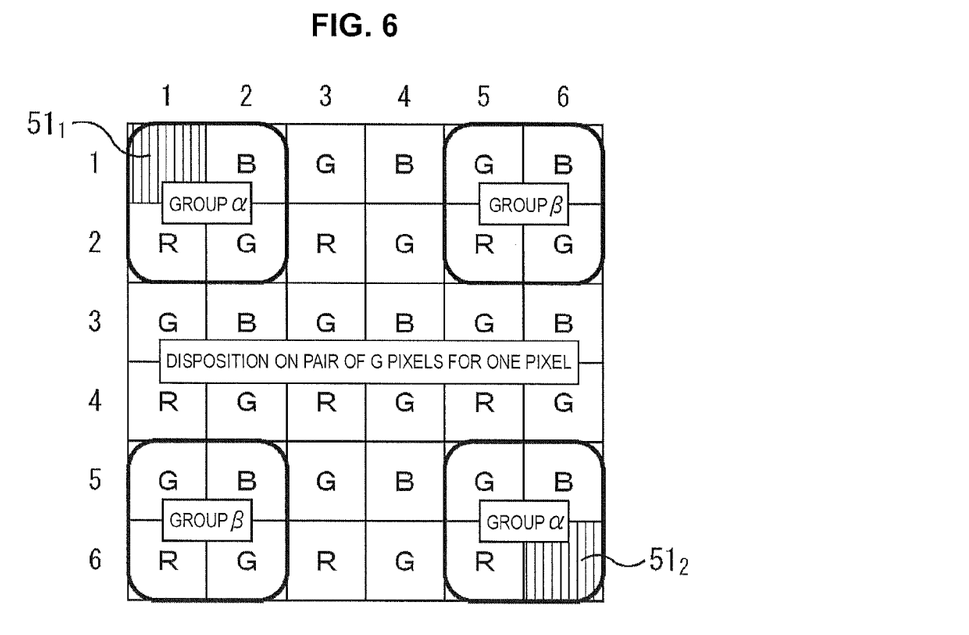
FIG. 6 is a third diagram showing another example of the sensor face of the CCD sensor.

Furthermore, as shown in FIG. 6, for example, the polarizer $51_1$ may be configured to be superimposed on the filer G in the upper left corner in the group α in the upper left corner of the drawing, and the polarizer $51_2$ to be superimposed on the filter G in the lower right corner in a group α' in the lower right corner of the drawing.

It should be noted that, in FIG. 6, the group α' is set in order to distinguish the group α in which the polarizer $51_2$ is superimposed on the filter G in the lower right corner of the group α in which the polarizer $51_1$ is superimposed on the filter G in the upper left corner.

In the case of FIG. 6, for example, the exposure evaluation value $x_\alpha$ is generated based on electric signals $G_\alpha$ output from the light sensing elements (1,1) and (6,6), and the exposure evaluation value $x_\beta$ is generated based on electric signals $G_\beta$ output from the light sensing elements (1,5) and (6,2).

Figure 7:
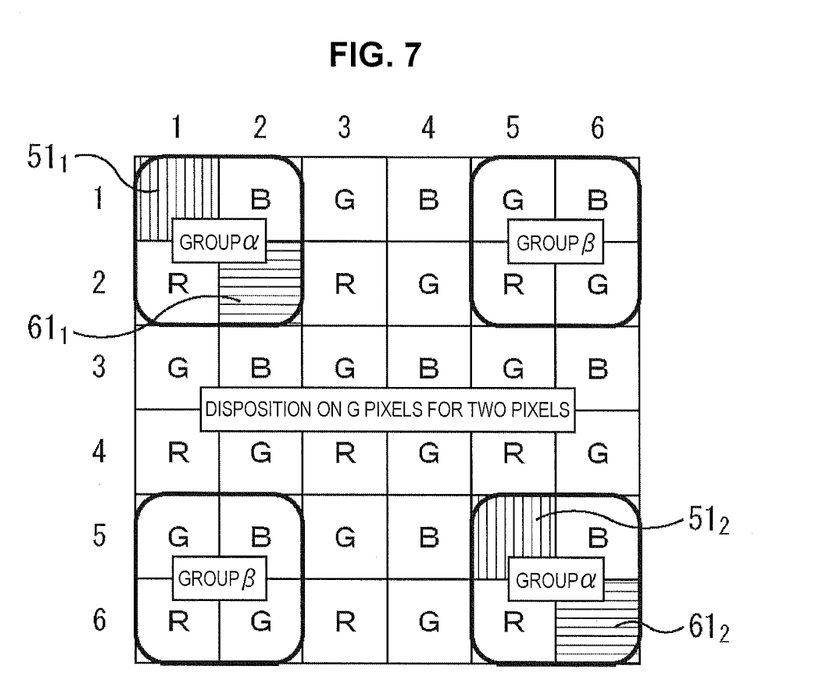
FIG. 7 is a fourth diagram showing another example of the sensor face of the CCD sensor.

In addition, as shown in FIG. 7, for example, the polarizers $51_1$ and $51_2$ may be configured to be superimposed on the filters G provided on the light sensing elements (1,1) and (5,5) in the upper left corners in the groups α, and polarizers $61_1$ and $61_2$ to be superimposed in the filters G provided on the light sensing elements (2,2) and (6,6) in the lower right corners therein.

In the case of FIG. 7, for example, the exposure evaluation value $x_\alpha$ is generated based on electric signals $G_\alpha$ output from the light sensing elements (1,1), (2,2), (5,5) and (6,6), and the exposure evaluation value $x_\beta$ is generated based on electric signals $G_\beta$ output from the light sensing elements (1,5), (2,6), (5,1) and (6,2).

Furthermore, when configured as shown in FIG. 7, the signal processing unit 26 can set an imaging mode of the digital camera 1 based on the electric signals $G_\alpha$ output from the light sensing elements (1,1) and (2,2) and then supplied via the gain control unit 24 and the AD converter 25.

In other words, the signal processing unit 26 computes, for example, the light blocking ratio of the polarizer $51_1$ and the light blocking ratio of the polarizer $61_1$ based on the electric signals $G_\alpha$ output from the light sensing elements (1,1) and (2,2).

Then, the signal processing unit 26 determines, based on the computed light blocking ratios, the type of light incident on the lens 21, i.e., the type of reflected light of light irradiated on a subject, and based on the determination result, sets an imaging mode of the digital camera 1.

To be specific, it is assumed that the polarizer $51_1$, for example, blocks (cuts) 45% of non-polarized light, blocks 100% of light of TE waves, and blocks 0% of light of TM waves (TM waves are not blocked).

In addition, it is assumed that the polarizer $61_1$, for example, blocks 35% of non-polarized light, blocks 0% of light of TE waves (TE waves are not blocked), and blocks 100% of light of TM waves.

In such a case, when the signal processing unit 26 computes the light blocking ratio of the polarizer $51_1$ to be 10% and the light blocking ratio of the polarizer $61_{11}$ to be 90%, reflected light from the subject corresponding to the group α shown on the upper left corner of FIG. 7 can be determined to be light polarized by the TM waves.

The present inventors found through experiment that, when the reflected light from the subject is polarized by the TM waves, it is highly likely for artificial light such as that from a fluorescent lamp to be radiated on the subject.

For this reason, when the reflected light from the subject corresponding to the group α shown on the upper left corner of FIG. 7 is light polarized by the TM waves, for example, the signal processing unit 26 can determine that the reflected light from the subject is artificial light.

As a case in which artificial light is radiated on a subject, for example, a case in which artificial light from an indoor fluorescent lamp is radiated on a subject is considered. In such a case, the signal processing unit 26 sets the imaging mode of the digital camera 1 to be an indoor mode that is suitable for indoor imaging.

In addition, as a case in which artificial light is radiated on a subject, for example, a case in which artificial light from night scenery is radiated on the subject is considered. In such a case, the signal processing unit 26 sets the imaging mode of the digital camera 1 to be a night-view mode that is suitable for imaging night scenery.

2. Modified Example

In the present embodiment, for example, the amount of light sensed by the light sensing elements (1,1) and (5,5) is set to be ½ of the amount of light sensed by the light sensing elements (5,1) and (1,5) by superimposing the polarizers 51 on the filters G provided on the light sensing elements (1,1) and (5,5) as shown in FIG. 2.

However, furthermore, the amount of sensed light may be set to ½ by, for example, reducing the light sensing area of the light sensing elements (1,1) and (5,5) by ½, instead of providing the polarizers 51.

In addition, the amount of sensed light can be set to ½ by setting the exposure (light sensing) time of the light sensing elements (1,1) and (5,5) to be ½ of that of the light sensing elements (1,5) and (5,1).

Furthermore, for example, only the polarizers 51 may be provided in the light sensing elements (1,1) and (5,5), without providing the filters G. In such a case, the electric signals output from the light sensing elements (1,1) and (5,5) are only used to generate the exposure evaluation value $x_\alpha$. Furthermore, when the filters G are not provided in the light sensing elements (1,1) and (5,5), the filters G may not be provided in the light sensing elements (1,5) and (5,1) either, and the electric signals output from the light sensing elements (5,1) and (1,5) are only use to generate the exposure evaluation value $x_\beta$.

In FIG. 7, the polarizers $51_1$ and $51_2$ are set to be provided on the filters G of the light sensing elements (1,1) and (5,5). In addition, as polarizers of a different kind from the polarizers $51_1$ and $51_2$, the polarizers $61_1$ and $61_2$ having polarization main axes different from those of the polarizers $51_1$ and $51_2$ are set to be provided on the filters G of the light sensing elements (2,2) and (6,6).

However, the number of types of polarizers provided in a group α is not limited to two, and three or more types are possible. It should be noted that, when three types of polarizers are disposed on the filters G in a superimposing manner, for example, three light sensing elements in which the filters G are provided are included in a group α.

In addition, when three types of polarizers are disposed on the filters G in a superimposing manner in a group α, for example, the difference of respective angles between polarization main axes thereof can be set to be 60 degrees. In other words, when N (N is a natural number equal to or higher than 2) types of polarizers are disposed in a superimposing manner in the group α, the difference of respective angles between polarization main axes thereof can be set to be 180/N.

The present embodiment has described the digital camera 1, but the present technology can be applied to any electronic devices as long as the devices control exposure when a subject is imaged.

Additionally, the present technology may also be configured as below.

(1) A control device including:
an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided;
an exposure information generation unit that generates exposure information for controlling exposure during imaging of a subject based on electric signals obtained from photoelectric conversion performed by the second light sensing elements; and
an exposure control unit that controls exposure based on the exposure information.

(2) The control device according to (1), further including:
light blocking units provided on the second light sensing elements so that part of the incident light is blocked,
wherein the second light sensing elements perform photoelectric conversion to convert incident light of the second light sensing amount sensed through the light blocking units into the electric signals.

(3) The control device according to (2), wherein the light blocking units are polarizers that block part of the incident light by polarizing the incident light.

(4) The control device according to (1) to (3), wherein, among the plurality of light sensing elements provided in the imaging element, a second number of the second light sensing elements are disposed, the second number being lower than a first number, in a block in which the first number of light sensing elements are set to be one unit.

(5) The control device according to (4), wherein, within the block, at least one type of the polarizers is provided.

(6) The control device according to (5), wherein, within the block, a first polarizer which transmits only light corresponding to transverse electric (TE) waves and a second polarizer which transmits only light corresponding to transverse magnetic (TM) waves are provided.

(7) The control device according to (3),
wherein filters that separate colors are provided on the first light sensing elements, and
wherein the polarizers are provided on the second light sensing elements.

(8) The control device according to (7), wherein the filters on which the polarizers are superimposed are also provided on the second light sensing elements.

(9) The control device according to (8), wherein the respective filters disposed on the plurality of light sensing elements are arrayed according to a Bayer array.

(10) The control device according to (6), further including:
a determination unit that determines a type of the incident light based on electric signals output from the second light sensing elements on which the first polarizers are provided and electric signals output from other second light sensing elements on which the second polarizers are provided.

(11) The control device according to (10), further including:
an imaging generation unit that generates a captured image obtained by imaging a subject based at least on electric signals obtained from the first light sensing elements; and
a setting unit that sets an imaging mode of the imaging generation unit based on a determination result of the determination unit.

(12) The control device according to (1) to (11), wherein the exposure information generation unit generates the exposure information based on electric signals obtained from photoelectric conversion performed by the first light sensing elements when an amount of incident light is less than a predetermined amount of light, and generates the exposure information based on electric signals obtained from photoelectric conversion performed by the second light sensing elements when an amount of incident light is equal to or greater than the predetermined amount of light.

(13) The control device according to (1) to (11), wherein the second light sensing elements sense incident light in the second light sensing amount on light sensing faces of the second light sensing elements, the light sensing faces being smaller than light sensing faces of the first light sensing elements.

(14) The control device according to (1) to (11), wherein the second light sensing elements sense incident light in the second light sensing amount for a light sensing time which is shorter than a light sensing time of the first light sensing elements.

(15) A control method of a control device that includes an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, the control method performed by the control device, including:
    generating exposure information for controlling exposure during imaging of a subject based on electric signals obtained from photoelectric conversion performed by the second light sensing elements; and
    controlling exposure based on the exposure information.

(16) A program that instructs a computer of a control device, which includes an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided, to function as:
    an exposure information generation unit that generates exposure information for controlling exposure during imaging of a subject based on electric signals obtained from photoelectric conversion performed by the second light sensing elements; and
    an exposure control unit that controls exposure based on the exposure information.

The above-described series of processing may be performed by hardware or may be performed by software. When the series of processing is performed by software, a program forming the software is installed into a computer that is incorporated in a dedicated hardware, or installed from a program storage medium into a general-purpose personal computer, for example, that can perform various types of functions by installing various types of programs.

[Exemplary Configuration of Computer]

Figure 8:
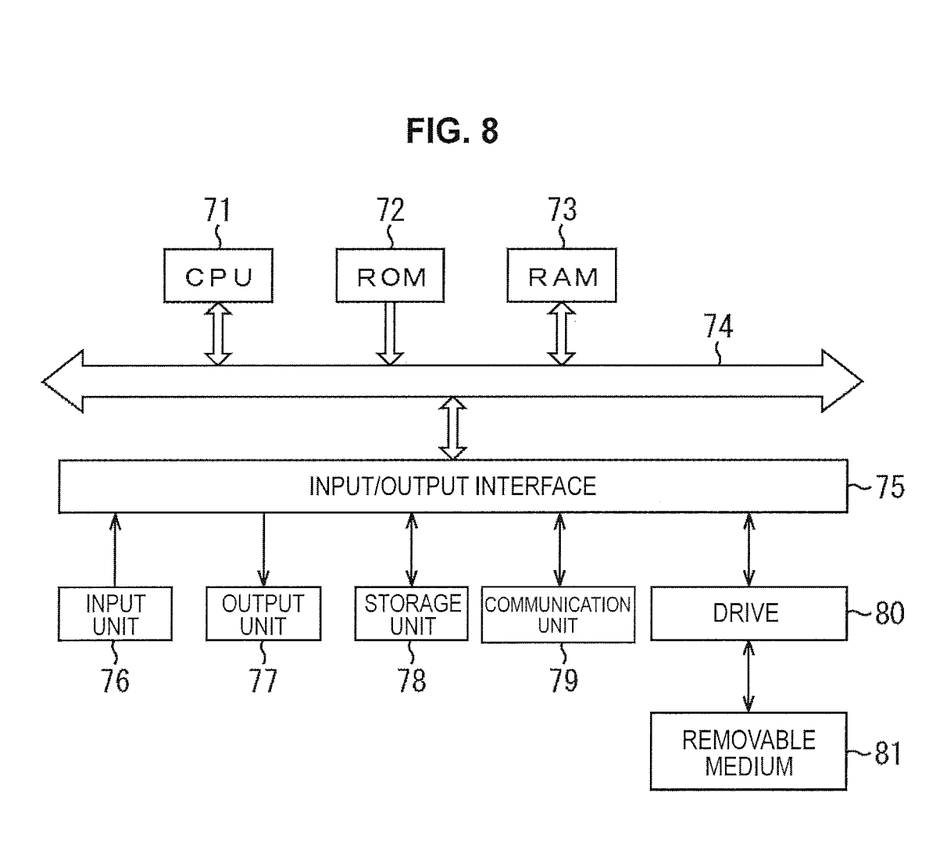
FIG. 8 is a block diagram showing a configuration example of hardware of a computer.

FIG. 8 shows an exemplary configuration of a computer implemented by the above-described sequence of processes by a program.

A central processing unit (CPU) 71 performs each type of process according to a program stored in a read only memory (ROM) 72 and a storage unit 78. A random access memory (RAM) 73 properly stores a program executed by the CPU 71, data, or the like. The CPU 71, the ROM 72, and the RAM 73 are interconnected to each other through a bus 74.

The CPU 71 is also connected to an input/output interface 75 through the bus 74. The input/output interface 75 is connected to an input unit 76 and an output unit 77. The input unit 76 includes a keyboard, a mouse, a microphone, and the like. The output unit 77 includes a display, a loud speaker, and the like. The CPU 71 performs various types of process according to the instructions input from the input unit 76. Then, the CPU 71 outputs the result of the process to the output unit 77.

The storage unit 78 connected to the input/output interface 75 includes, for example, a hard disc, and stores a program executed by the CPU 71 and various data. A communication unit 79 communicates with an external device through a network such as the Internet or a local area network.

Alternatively, a program can be obtained through the communication unit 79 and can be stored in the storage unit 78.

When the removable medium 81 is mounted on the computer, a drive 80 connected to the input/output interface 75 drives a removable medium 81 such as a magnetic disk, an optical disk, a magneto optical disk or a semiconductor memory to obtain a program, data or the like recorded on the removable medium 81. The obtained program or data is transferred to and stored in the storage unit 78 as necessary.

The program installed on a computer and to be executed by the computer is recorded on (stored in) a recording medium including the removable medium 81 as shown in FIG. 8, a hard disc or the like. The removable medium 81 is a package medium including, for example, a magnetic disk (including a flexible disk), an optical disk (including a compact disc-read only memory (CD-ROM), or a digital versatile disc (DVD)), a magneto optical disk (including a mini-disc (MD)), or a semiconductor memory. The hard disc includes the ROM 72 temporarily or permanently storing a program and the storage unit 78. The recording medium records a program, as necessary, through the communication unit 79 using a wired or wireless transmission medium such as a local area network, the Internet, and a digital satellite broadcast. The communication unit 79 is an interface of a router, a modem, or the like.

Note that the description of the above-described sequence of processes herein includes not only processes sequentially performed in the described time order but also processes performed in parallel or separately, not necessarily sequentially.

Embodiments of the present disclosure are not limited to the above-described embodiments and can be variously modified within the gist of the present disclosure.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-149007 filed in the Japan Patent Office on Jul. 3, 2012, the entire content of which is hereby incorporated by reference.

What is claimed is:

1. A control device comprising:
    an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided;
    an exposure information generation unit that generates exposure information for controlling exposure during imaging of a subject based on electric signals obtained from photoelectric conversion performed by the second light sensing elements; and
    an exposure control unit that controls exposure based on the exposure information.

2. The control device according to claim 1, further comprising: light blocking units provided on the second light sensing elements so that part of the incident light is blocked, wherein the second light sensing elements perform photoelectric conversion to convert incident light of the second light sensing amount sensed through the light blocking units into the electric signals.

3. The control device according to claim 2, wherein the light blocking units are polarizers that block part of the incident light by polarizing the incident light.

4. The control device according to claim 3, wherein, among the plurality of light sensing elements provided in the imaging element, a second number of the second light sensing elements are disposed, the second number being lower than a first number, in a block in which the first number of light sensing elements are set to be one unit.

5. The control device according to claim 4, wherein, within the block, at least one type of the polarizers is provided.

6. The control device according to claim 5, wherein, within the block, a first polarizer which transmits light corresponding to transverse electric (TE) waves and a second polarizer which transmits light corresponding to transverse magnetic (TM) waves are provided.

7. The control device according to claim 3, wherein filters that separate colors are provided on the first light sensing elements, and wherein the polarizers are provided on the second light sensing elements.

8. The control device according to claim 7, wherein the filters on which the polarizers are superimposed are also provided on the second light sensing elements.

9. The control device according to claim 8, wherein the filters disposed on the plurality of light sensing elements are arrayed according to a Bayer array.

10. The control device according to claim 6, further comprising:
a determination unit that determines a type of the incident light based on electric signals output from the second light sensing elements on which first polarizers are provided and electric signals output from other second light sensing elements on which second polarizers are provided.

11. The control device according to claim 10, further comprising:
an imaging generation unit that generates a captured image obtained by imaging a subject based at least on electric signals obtained from the first light sensing elements; and
a setting unit that sets an imaging mode of the imaging generation unit based on a determination result of the determination unit.

12. The control device according to claim 1, wherein the exposure information generation unit generates the exposure information based on electric signals obtained from photoelectric conversion performed by the first light sensing elements when an amount of incident light is less than a predetermined amount of light, and generates the exposure information based on electric signals obtained from photoelectric conversion performed by the second light sensing elements when an amount of incident light is equal to or greater than the predetermined amount of light.

13. The control device according to claim 1, wherein the second light sensing elements sense incident light in the second light sensing amount on light sensing faces of the second light sensing elements, the light sensing faces being smaller than light sensing faces of the first light sensing elements.

14. The control device according to claim 1, wherein the second light sensing elements sense incident light in the second light sensing amount for a light sensing time which is shorter than a light sensing time of the first light sensing elements.

15. A control method comprising:
in a control device that includes an imaging element in which, as a plurality of light sensing elements that perform photoelectric conversion to convert incident light entering via a light collecting unit into electric signals, first light sensing elements that sense the incident light in a first light sensing amount and second light sensing elements that sense the incident light in a second light sensing amount that is smaller than the first light sensing amount are provided:
generating exposure information for controlling exposure during imaging of a subject based on electric signals obtained from photoelectric conversion performed by the second light sensing elements; and
controlling exposure based on the exposure information.

16. A non-transitory computer-readable storage medium having stored thereon, a set of computer executable instructions for causing a computer to perform steps comprising:
in a control device that includes an imaging element in which, as a plurality of light sensing elements that perform photoelectric conversion to convert incident light into electric signals, first light sensing elements that sense the incident light in a first light sensing amount and second light sensing elements that sense the incident light in a second light sensing amount that is smaller than the first light sensing amount are provided:
generating exposure information for controlling exposure during imaging of a subject based on electric signals obtained from photoelectric conversion performed by the second light sensing elements; and
controlling the exposure based on the exposure information.

* * * * *